United States Patent
Radcliffe et al.

[11] Patent Number: 6,136,408
[45] Date of Patent: Oct. 24, 2000

[54] SURFACE TREATMENT FOR WOOD MATERIALS INCLUDING ORIENTED STRAND BOARD

[75] Inventors: Scott H. Radcliffe, Watkinsville; Thomas L. Lee, Statham; Robert D. Palardy, Athens, all of Ga.

[73] Assignee: J. M. Huber Corporation, Edison, N.J.

[21] Appl. No.: 08/977,885

[22] Filed: Nov. 25, 1997

[51] Int. Cl.[7] ............... B32B 5/12; B32B 21/04; B05D 3/02; H05B 6/00
[52] U.S. Cl. .................. 428/107; 428/109; 428/170; 428/218; 428/292.4; 428/297.4; 428/425.1; 428/537.1; 427/317; 427/325; 264/446; 264/29.4
[58] Field of Search ............... 428/292.4, 297.4, 428/411.1, 423.1, 425.1, 537.1, 537.5, 106, 107, 109, 218, 156, 219, 146, 165, 170; 427/317, 325, 393; 264/413, 446, 29.4, 29.7

[56] References Cited

U.S. PATENT DOCUMENTS

| | | | |
|---|---|---|---|
| 18,828 | 12/1857 | Tenney et al. | 427/532 |
| 4,170,668 | 10/1979 | Lee et al. | 427/223 |
| 4,701,355 | 10/1987 | Cottingham | 427/317 |
| 4,833,182 | 5/1989 | Israel et al. | 524/14 |
| 4,933,232 | 6/1990 | Trout et al. | 428/288 |
| 5,124,210 | 6/1992 | Fong | 428/425.1 |
| 5,464,680 | 11/1995 | Hauser et al. | 428/141 |
| 5,525,394 | 6/1996 | Clarke et al. | 428/105 |
| 5,545,449 | 8/1996 | Tiedeman | 428/34.2 |
| 5,591,505 | 1/1997 | Rusek, Jr. et al. | 428/69 |
| 5,593,625 | 1/1997 | Riebel et al. | 264/115 |
| 5,607,635 | 3/1997 | Melbye et al. | 264/169 |
| 5,614,299 | 3/1997 | Yamamoto et al. | 523/500 |
| 5,652,065 | 7/1997 | Park et al. | 428/537.1 |
| 5,653,080 | 8/1997 | Bergeron | 52/729.4 |
| 5,663,221 | 9/1997 | Barcas | 524/15 |
| 5,716,563 | 2/1998 | Winterowd et al. | 264/45.5 |
| 5,741,823 | 4/1998 | Hsu | 521/70 |
| 5,810,956 | 9/1998 | Tanis et al. | 156/71 |

FOREIGN PATENT DOCUMENTS

| | | |
|---|---|---|
| 55-042828A | 3/1980 | Japan . |
| 62-211442A | 9/1987 | Japan . |

OTHER PUBLICATIONS

KJ. Charrier; Polymeric Materials and Processing, Plastics, Elastomers and Composites; 3.3 Thermosetting Resins (Thermosets); pp. 181–192.

*Primary Examiner*—Paul Thibodeau
*Assistant Examiner*—Sheeba Ahmed
*Attorney, Agent, or Firm*—Carlos Nieves; Jonathan N. Provoost

[57] ABSTRACT

Oriented strand board is post-fabrication treated with a polymeric coating which includes isocyanate constituents to produce a construction material which is smooth, has high gloss, and which is resistant to water, vapor, and chemical penetration. The isocyanate constituents are most preferably MDI or PMDI, and may be present in a coating composition alone or in combination with other binder materials such as PEEG or other polyols. Prior to application of the coating composition, the surface of the oriented strand board is pretreated using heat and pressure to compress and densify wood at the surface, and to smooth out minor surface irregularities. The coating composition is then applied to the wood surface, and is cured to form a polymeric coating which bonds to the wood material. The polymeric coating is preferably a polyurethane and functions to prevent water, vapor, and chemical penetration into the oriented strand board, thereby permitting its use as a construction material in a wide variety of applications it heretofore has not achieved commercial acceptance. In addition, the polymeric coating provides the oriented strand board with a smooth surface.

20 Claims, 1 Drawing Sheet

SURFACE TREATMENT FOR WOOD MATERIALS INCLUDING ORIENTED STRAND BOARD

BACKGROUND OF THE INVENTION

1. Field of the Invention

The invention is generally related to oriented strand board and, more particularly, to improving the surface characteristics of oriented strand board (e.g., appearance, water, vapor, and chemical resistance, smoothness, paintability, etc.) to enable its use in a wide variety of construction applications. The invention is generally applicable to the post fabrication treatment of other wood construction products including plywood and solid sawn lumber.

2. Background Description

Oriented strand board is commercially available from a number of companies including J. M. Huber Corporation, Georgia-Pacific Corporation, Louisiana-Pacific, and a number of other sources. This material has multiple layers of wood "flakes" or "strands" bonded together by a binding material such as phenol formaldehyde resin or isocyonate resin together with sizing agents such as paraffinic waxes. The flakes are made by cutting thin slices with a knife edge parallel to the length of a debarked log. The flakes are typically 0.01 to 0.5 inches thick, although thinner and thicker flakes can be used in some applications, and are typically, less than one inch to several inches long and less than one inch to a few inches wide. The flakes typically are longer than they are wide. In the fabrication of oriented strand board, the flakes are first dried to remove water, and are then coated with a thin layer of binder and sizing agent. The coated flakes are then spread on a conveyor belt in a series of alternating layers, where one layer will have the flakes oriented generally in line with the conveyor belt, and the succeeding layer of flakes oriented generally perpendicular to the conveyor belt, such that alternating layers have flakes oriented generally perpendicular to one another. The word "strand" is used to signify the cellulosic fibers which make up the wood, and, because the grain of the wood runs the length of the wood flake, the "strands" in the oriented strand board are oriented generally perpendicular to each other in alternating layers. The layers of oriented "strands" or "flakes" are finally subjected to heat and pressure to fuse the strands and binder together. The resulting product is then cut to size and shipped. Typically, the resin and sizing agent comprise less than 10% by weight of the oriented strand board product.

The fabrication of oriented strand board is described in U.S. Pat. No. 5,525,394 to Clarke et al., and that patent is herein incorporated by reference. Oriented strand board has been used in sheathing walls, wooden I-beam structural supports, and in roofs and floors where strength, light weight, ease of nailing and dimensional stability under varying moisture conditions are the most important attributes. Oriented strand board is sold at a substantial discount compared to structural grades of soft plywood.

Oriented strand board has met with some resistance to commercial acceptance in certain applications where moisture resistance or durability is premium or where smoother surfaces are premium. For instance, in the manufacture of concrete forms, the wood material is subjected to water and chemical entities which can degrade the board, particularly at the edges. Likewise, edge delamination problems may occur in flooring applications where the board is subjected to pooled water for extended periods of time. Moreover, the coarse surface of oriented strand board can have an adverse aesthetic impact in walls, signage and other applications where the appearance of the material can be discerned after application of paint or other surface treatments.

Several techniques have been developed to address these concerns. Fore example, U.S. Pat. No. 5,525,394 to Clarke describes an oriented strand board structure which has progressively smaller strands towards its upper surface, and a dry process fiberboard overlay layer on its uppermost surface. Clarke explains that this lay up enables the top surface to be embossed with precision. Of interest, the Clarke process has found application in the commercial production of oriented strand board products which have been embossed to resemble a natural "wood grain" finish. U.S. Pat. No. 5,635,248 to Hsu et al. describes a process for producing a smooth hard finish on products such as oriented strand board. In Hsu, a foamed polymerized latex emulsion is applied to the surface and dried. After drying, the emulsion is crushed, and then cured to form the coating, with post-cure heat treatments being found to improve the hardness of the coating. U.S. Pat. No. 5,554,429 to Iwata et al. discloses an oriented strand board flooring material which is indicated to have significant moisture resistance. In Iwata, the oriented strand board is fabricated with the surface layers having strands with longer average length values and wider average width values than the centrally located layers. Iwata uses a foaming urethane resin and a non-foaming aqueous emulsion-type phenol resin in combination to join the wood strips together. Iwata also contemplates attaching a decorative sheet of material (e.g., oak veneer) to the oriented strand board surface using an aqueous polymeric isocyanate adhesive, and subsequently overcoating the decorative sheet with a polyurethane, thus producing high gloss, decorative, wood flooring which has the appearance of oak. The complete contents of each of these patents is herein incorporated by reference.

A significant disadvantage of each of the above-discussed surface treatments is that they involve using additional materials as the surface layer, and therefore result in increased costs. What is needed is a low-cost and effective surface treatment which improves the surface characteristics of oriented strand board.

SUMMARY OF THE INVENTION

According to the invention, an oriented strand board panel is sanded and then subjected to a pretreatment which creates a surface transition region on the exposed wood. It is preferred that the pretreatment be a heat and pressure treatment, referred to as "re-cooking" because it is a separate heat step from that which is used when the strands are fused together in a press. The re-cooking densifies the surface and smoothes out minor surface irregularities. This procedure also begins to caramelize the short-chain carbohydrates (hemicelluloses) in the wood cell walls. The resulting board has a very smooth surface, with reduced porosity. After re-cooking or other surface pretreatment, a composition which includes isocyanate constituents is applied to the surface. The preferred isocyanate constituents are methylene diphenyl diisocyanate (MDI) and polymeric methylene diphenyl diisocyanate (PMDI), and these. constituents can be used in combination with other materials such as polyols (e.g., polyethylene glycol), phenol-formaldehyde, etc., as well as in combination with wood fines (small pieces of wood fibers on the order of less than ½ inch in size which are typically treated as waste), flours, dyes, etc. It was determined that the isocyanates MDI and PMDI penetrate and impregnate the surface of the wood, rather than acting as a simple topical treatment. Thus, upon curing the coating composition, the resulting polymeric coating, which preferably takes the form of a polyurethane, is mechanically and chemically bound to the oriented strand board surface. The mechanical binding results from impregnation into the wood fibers with subsequent hardening after penetration. Chemical binding results from urethane linkages to the cellulose and hemicellulose in the wood materials which make up the oriented strand board. After curing, the resulting oriented strand board product has improved surface characteristics such as smoothness, hardness, and increased resistance to water, vapors, and certain chemicals.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
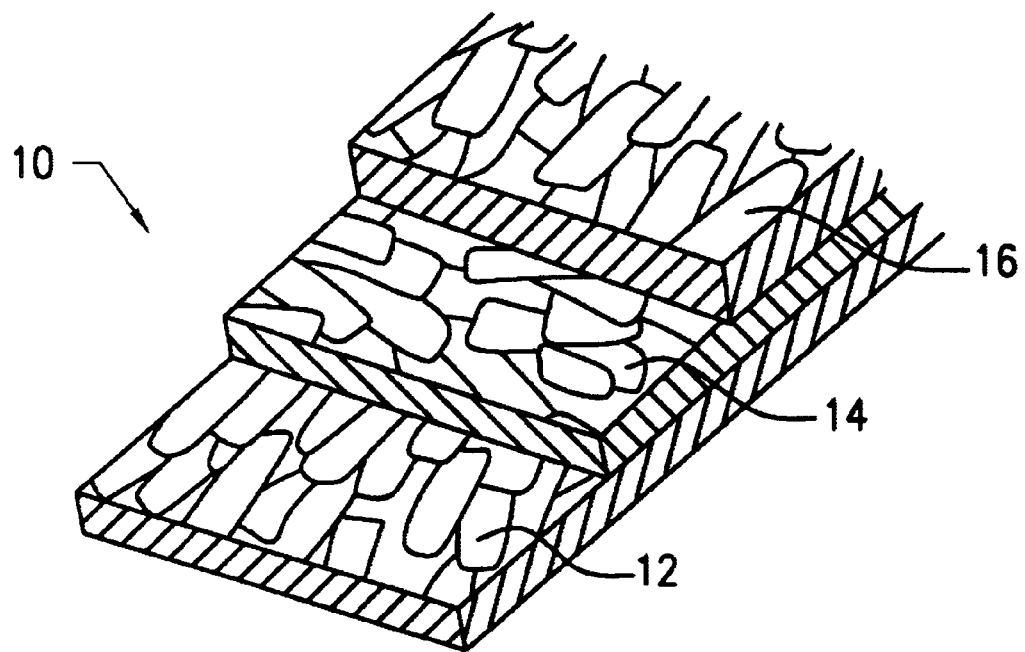
FIG. 1 is a cut-away isometric view of an oriented strand board panel showing the general orientation of wood flakes in the pressed, composite product.

With reference to FIG. 1, it can be seen that oriented strand board 10 is comprised of multiple layers 12, 14, and 16, of wood "flakes" or "strands" which are oriented generally perpendicular to each other in adjacent layers. The size of the strands can vary and the number of layers in the oriented strand board can vary to meet a wide range of design requirements. In addition, the size of strands in different layers and within a layer may also vary. As discussed above, the strands are held together by a binding material, and the oriented strand board typically includes a wax for sizing. Oriented strand board 10 can be produced by a variety of techniques; however, common to all fabrication processes is a step of subjecting layers 12, 14, and 16 to high temperature and pressure to fuse and bind them together using the binding material. Typical binding materials include PMDI, phenol formaldehyde, melamine-formaldehyde, urea-formaldehyde, and combinations of the above.

Figure 2:
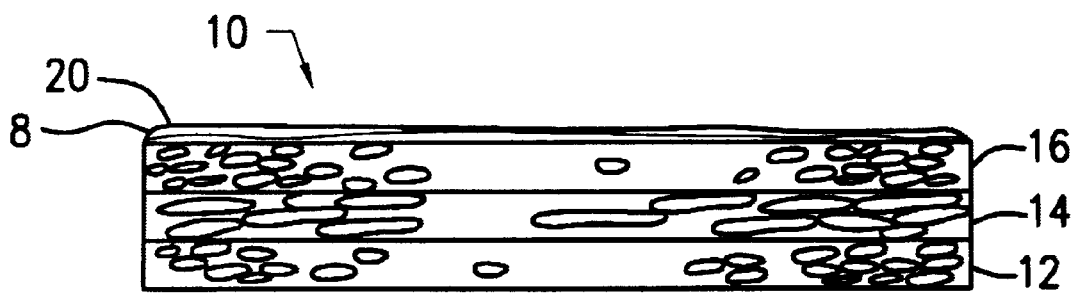
FIG. 2 is an end view of the oriented strand board panel shown in FIG. 1 which shows a dense transitional region coated with a polymeric MDI coating as a surface treatment according to the present invention.

FIG. 2 shows the oriented strand board 10 with a surface treatment according to the present invention in the form of a polymeric MDI coating 20 on top of a transitional region 18. As discussed above, the transitional region 18 could be a densified (reduced porosity relative to the inner regions) and smooth surface area of the oriented strand board formed by re-cooking. Alternatively, the transitional region 18 could be produced by a chemical treatment or radiation exposure of the surface wood of the oriented strand board 10 to alter the characteristics of the wood and enhance binding of the polymeric MDI coating 20 to the oriented strand board. The surface treatment provides a seal against moisture, vapors and other chemical agents, and increases the hardness of the surface. In addition, the surface treatment gives the oriented strand board 10 a smooth surface without requiring the addition of paper or veneer to the surface.

The procedure which has been determined to provide the best results first requires that the oriented strand board 10 be re-cooked. In this case, the oriented strand board is clean sanded on both faces after fabrication. To re-cook the surfaces, the oriented strand board is usually put into a hot press. Re-cooking will burn off any extraneous fibers or "fuzz" on the surface of the board 10 which remains after the sanding process, densify the outer surface layers, and will begin to caramelize the short-chain carbohydrates (hemicelluloses) in the wood cell walls. Good results have been achieved using a standard hot press with platen temperatures set to approximately 400° F. for thirty seconds with pressures ranging from 300–900 pounds per square inch (psi). The time, pressure and temperatures can vary widely within the practice of this invention, and it will be apparent to those of skill in the art that increased pressures can result in requiring lower temperatures and vice versa, and that milder temperature and pressure conditions can result in increased exposure times (the opposite being true for harsher conditions). If hot presses are used for re-cooking, it is expected that temperatures ranging from 300° F. to 500° F., and pressures ranging from 300 psi to 900 psi will be most appropriate.

While experiments with hot presses have produced satisfactory results, it will be apparent that results similar to those achieved by the re-cooking process described above may be achieved by other means such as chemical treatments, exposure to radiant energy, etc. The chief requirements are that the surface of the oriented strand board become more dense (e.g., wood material at the surface has a reduced porosity compared with the center portions of the board 10), and smooth (that is, minor surface irregularities become smoothed out) at its surface, or that the surface is otherwise altered to have a transition region which can better accept and bind to a polymer composition including isocyanates. This process results in both physical and chemical surface changes which enhance the ability of the polymer forming composition to impregnate and bond to the wood material in the oriented strand board 10. Experiments have shown that without this surface pre-treatment, the resulting surface is not as smooth.

After the surface of the oriented strand board has been pre-treated, such as by re-cooking, a composition containing isocyanate constituents is applied to the surface. The preferred isocyanate constituents are MDI and PMDI. Experiments have shown that isocyanates, such as MDI and PMDI, penetrate and impregnate the wood at the surface of the oriented strand board, rather than acting as a simple topical treatment. Conversely, liquid phenolic resins and melamine did not have equivalent impregnation, bonding, and hardness properties. The composition can contain additional polymer forming constituents including polyols, phenol-formaldehyde, catalysts, etc., as well as decorative constituents such as wood fines, dyes, and the like. It is preferred that the composition will include between 1–100% by weight of the isocyanate constituents and will have a consistency of 100 to 6000 cps which will allow the composition to flow or be spread over the surface of the oriented strand board. The composition can be applied by roll coater, curtain coater, doctor blade, dipping or drawing oriented strand board into or through a container of the composition, or by spraying the composition uniformly over the transitional region on the oriented strand board surface. Preferably 5–100 grams per square foot are applied to the surface of the board. A particular advantage of this invention is that the same or similar materials (those containing MDI and/or PMDI) used for the polymer coating might also be used to bond the strands together during fabrication of the oriented strand board.

In order to facilitate the formation of a generally uniform coat of polymer on the surface of the oriented strand board, the composition should be applied at a low temperature which does not start the cure reaction of the isocyanate constituents. This can be achieved by cooling the panels prior to application of the composition. However, application techniques may be used which allow high temperature application of the composition. The chief requirement for application procedures being that the isocyanate constituents must be permitted to penetrate into and bind to the wood material.

Once coated onto the surface of the oriented strand board, the composition is cured to produce a smooth, tightly adhered, polymeric coating. Curing can be achieved using heat and pressure processing. Good results have been achieved when curing in a 400° F. press at pressures ranging from 100–900 psi for 120 seconds; however, as described above, the temperature can be varied (most preferred range being from 300–500° F.), pressure can be varied (most preferred range from 100–900 psi), and time can be varied (most preferred range from 30 seconds to four minutes) within the practice of the invention. Alternatively, curing can be achieved by exposing the coated oriented strand board to radiant energy (ultraviolet, electron beam, etc.).

The cured composition is a polymeric coating that is preferably generally polyurethane in character with urethane links to the cellulose and hemicellulose materials in the densified surface region of the oriented strand board. In addition, due to the penetration of the isocyanates into the wood material, the polymeric coating is physically or "mechanically" bonded to the wood material. As is best shown in FIG. 2, the polymeric coating 20 is on top of a densified transitional region 18, and is tightly adhered thereto by chemical and mechanical bonding with the wood material in the oriented strand board, particularly at the densified transitional region 18. The polymeric coating provides a smooth surface which is resistant to water, vapor, and chemical attack. Thus, the finished product is a construction material which can be used in a wide variety of commercial applications where it heretofore has met with some resistance to commercial acceptance.

While the above discussion has described a technique for post fabrication treatment and coating of an oriented strand board product, the technique has also been successfully used on other wood construction products such as plywood and solid sawn lumber. With these materials, the wood is sanded and then pre-treated, such as by re-cooking, prior to the application of a composition containing isocyanate constituents. This treatment makes the wood product more resistant to moisture, and the wood product has a smooth, hard surface.

While the invention has been described in terms of its preferred embodiments, those skilled in the art will recognize that the invention can be practiced with modification within the spirit and scope of the appended claims.

We claim:

1. A method for improving the surface properties of a wood board, comprising the steps of:
   providing a wood board having a surface and an inner region, where said surface and said inner region are both comprised of wood material;
   pre-treating the wood board to produce a transitional region on the surface by heating and pressing the wood board effective to (i) increase the density of wood material at the surface relative to wood material at the inner region, (ii) initiate carmelization of short-chain carbohydrates in wood cell walls of said wood material at said surface, and (iii) burn off any extraneous fibers on said surface;
   cooling the pre-treated wood board;
   applying, after said pre-treating step, a polymer forming composition including isocyanate constituents to said transitional region on said surface of the pretreated wood board; and
   curing said composition to form a polymeric coating on said wood board bonded to wood material in said wood board, to thereby form a construction material having increased moisture resistance and a smooth, hard surface.

2. The method of claim 1 wherein said step of curing is performed by irradiation exposure.

3. The method of claim 1 wherein said step of curing is performed by heating.

4. The method of claim 1 wherein said isocyanate constituents are selected from the group consisting of methylene diphenyl diisocyanate and polymeric methylene diphenyl diisocyanate.

5. The method of claim 1 wherein said curing step produces a polyurethane.

6. The method of claim 1 wherein said step of pretreating is performed in a press at a temperature ranging from 300–500° F. at a pressure ranging from 300–900 psi.

7. The method of claim 6 wherein said wood board is selected from the group consisting of oriented strand board, plywood, and sawn lumber.

8. A construction material, comprising:
   a wood board having a surface and an inner region, where said surface and said inner region are both comprised of wood material;
   a cured polymeric coating adhered to said wood board; and
   a transitional region on said surface of said wood board, wherein said transitional region is more dense than the inner region of said wood board, said polymeric coating adhering to said transitional region, and wherein said transitional region on said surface is the product of a pretreating procedure comprising heating and pressing the wood board effective to (i) increase the density of wood material at the surface relative to wood material at the inner region, (ii) initiate carmelization of short-chain carbohydrates in wood cell walls of said wood material at said surface, and (iii) burn off any extraneous fibers on said surface, where said pretreating procedure is performed prior to separate procedures of (a) applying to the transitional region a polymer forming composition including isocyanate constituents which penetrate into said surface of the pretreated wood board, and (b) curing of the composition to form the cured polymeric coating adhered to the transitional region of said wood board, to thereby form a construction material having increased moisture resistance and a smooth, hard surface.

9. The construction material recited in claim 8 wherein said wood board is an oriented strand board.

10. The construction material recited in claim 8 wherein the surface of the wood board is sanded prior to said pretreating process.

11. The construction material recited in claim 8 wherein the pretreating process is performed in a hot press at a temperature ranging from 300–500° F.

12. The construction material recited in claim 8 wherein the greater density of the transitional region relative to the inner region of said wood board comprises a reduced porosity in the transitional region relative to the inner region.

13. The construction material recited in claim 8 wherein said applying step comprises applying said composition to said transitional region at a rate of 5–100 grams per square foot, where said composition contains said isocyanate constituents in an amount of between 1–100% by weight of said composition, and said composition has a consistency of 100 to 6000 cps.

14. The construction material recited in claim 8 wherein, during said applying step, said composition is applied to said transitional region at a temperature sufficiently low to avoid starting a curing reaction of the isocyanate constituents prior to said curing step.

15. The construction material recited in claim 8 wherein said applying step comprises applying said composition as a uniform coating on said transitional region.

16. The construction material recited in claim 8 wherein said step of pretreating is performed in a press at a temperature ranging from 300–500° F. and at a pressure ranging from 300–900 psi.

17. The construction material recited in claim 8 wherein the cured polymeric coating comprises a polyurethane.

18. The construction material recited in claim 8 wherein said composition includes isocyanate constituents selected from the group consisting of methylene diphenyl diisocyanate and polymeric methylene diphenyl diisocyanate.

19. The construction material recited in claim 8 wherein said wood board is selected from the group consisting of oriented strand board, plywood, and sawn lumber.

20. The construction material recited in claim 8 wherein said curing step comprises hot pressing the board at 300–500° F. under a pressure of from 100 to 900 psi.

* * * * *